United States Patent [19]

Ogawa

[11] Patent Number: 6,072,479
[45] Date of Patent: Jun. 6, 2000

[54] MULTIMEDIA SCENARIO EDITOR CALCULATING ESTIMATED SIZE AND COST

[75] Inventor: Ryuichi Ogawa, Tokyo, Japan

[73] Assignee: NEC Corporation, Tokyo, Japan

[21] Appl. No.: 08/919,273

[22] Filed: Aug. 28, 1997

[30] Foreign Application Priority Data

Aug. 28, 1996 [JP] Japan .................................... 8-226834
Aug. 15, 1997 [JP] Japan .................................... 9-235443

[51] Int. Cl.[7] .................................................. G06F 17/30
[52] U.S. Cl. ........................... 345/302; 345/326; 707/104
[58] Field of Search .................................... 707/100–104, 707/200–205, 501–502, 511–512, 516–517, 530–531, 514, 513; 345/202–203, 302, 328, 331, 335, 326, 329, 339, 428

[56] References Cited

U.S. PATENT DOCUMENTS

| | | | |
|---|---|---|---|
| 5,608,859 | 3/1997 | Taguchi .................................... | 345/302 |
| 5,675,753 | 10/1997 | Hansen et al. ........................... | 345/333 |
| 5,729,253 | 3/1998 | Mashita et al. .......................... | 345/352 |
| 5,748,956 | 5/1998 | Lafer et al. .............................. | 707/104 |
| 5,826,102 | 10/1998 | Escobar et al. .......................... | 345/302 |
| 5,852,435 | 12/1998 | Vigneaux et al. ....................... | 345/302 |
| 5,893,110 | 4/1999 | Weber et al. ............................ | 707/104 |
| 5,898,430 | 4/1999 | Matsuzawa et al. ..................... | 345/302 |

OTHER PUBLICATIONS

Andrea Caloini, et al., "Extending Styles to Hypermedia Document", *IEEE*, pp. 417–424, 1996.

"CBT Express", AimTech Corporation, 1995. (8 pages only).

Harada et al. Multimedia Authoring System 'MediaDesc' (2)—Storyboarding, NEC Corp., Draft Proceedings 3F–5 for the 52nd National Conference of Information Processing Society of Japan, 1996, pp. 3–237 and 238.

Storyboard Artist "Professional Previsualization Planning tool for Creating Multimedia Projects", Power Production Software; 1995 (found at http://writerscomputer.com/30/wcs36.htm) One page only.

(List continued on next page.)

*Primary Examiner*—Jack M. Choules
*Assistant Examiner*—Srirama Channavajjala
*Attorney, Agent, or Firm*—Foley & Lardner

[57] ABSTRACT

A scenario editing system comprises a drawing input module drawing graphic media objects or inputting existing media objects; a scene management module storing and managing said media objects; a surrogate media management module storing said media objects for use as surrogate media objects temporarily representing actual moving picture objects, voice objects, or image objects to be created later; a surrogate media list module displaying said surrogate media objects in a list of thumbnails; a media attribute input module allowing a user to enter a media-dependent attribute of an actual media object to be created, while said surrogate media list module displays the list; a calculation module calculating sizes of actual media data and adding up the media data sizes to estimate a total size of an overall application, based on said media-dependent attribute; and a calculation result display module displaying the result of said calculation. The media attribute input module allows a user to enter the name of a person in charge and scheduled development time as an attribute, wherein the calculation module adds up actual media creation costs for calculation of an estimate of the cost of each media type and an overall application, and wherein the calculation result display module displays cost information for each media type and for the overall application.

9 Claims, 14 Drawing Sheets

OTHER PUBLICATIONS

Movie Magic Scheduling "Professional Production Management Software", Screenplay Systems, 1995 (found at http://writerscomputer.com/30/wcs22.htm) 2 pages only.

Movie Magic Budgeting "Professional Production Estimation Software", Screenplay Systems, 1995 (found at http://writerscomputer.com/30/wcs21.htm) 2 pages only.

StoryBoard Quick, Power Production Software, (found at http://writerscomputer.com/30/wcs37.htm) 2 pages only.

Mac ToolKit Production Scheduler, Benjamin Cahan, 1990–1994 (found at http://writerscomputer.com/30/wcs24.htm) 2 pages only.

Mac ToolKit Budgeter, Benjamin Cahan, 1990–1994 (found at http://writerscomputer.com/30/wcs.htm) (One page only).

Turbo AD for Film and Video Production, Quantum Films, 1993 (found at http://writerscomputer.com/30/TurboAd.htm) 2 pages only.

Turbo Buget Film and Video Production, Quantum Films, 1993 (found at http://writerscomputer.com/30/turbbudget.htm) Five pages only.

Digital Box Office "The No–Scripting Interactive Multimedia Authoring Tool", Power Production Software, 1995 (found at http://writerscomputer.com/30/wcs16.htm) Two pages only.

MULTIMEDIA SCENARIO EDITOR CALCULATING ESTIMATED SIZE AND COST

BACKGROUND OF THE INVENTION

1. Field of the Invention

The present invention relates to a scenario editing system which helps create multimedia applications, such as those supplied as CD-ROM titles or distributed on the World Wide Web, beginning in the planning and design stage (scenario creation stage).

2. Description of the Related Arts

When creating multimedia application products which will be supplied as CD-ROM titles or distributed on the World Wide Web, the production work usually proceeds as follows: first, a producer or scenario writer writes a multimedia project chart or a story rough sketch (scenario) called a storyboard, then, based on this scenario, designers or creators create voice or video objects as actual media objects (hereinafter referred to as "media objects"), and then programmers assemble the media objects with the use of an authoring tool such as Director or Authorware. In a conventional computer-aided scenario creation method used in the scenario creation stage, rough sketches, comments, and so on are drawn on the screen to create a multimedia project chart. (See the description of "Scenario editing-display method and system" disclosed in Japanese Patent Application No. 3-327222, hereinafter referred to as prior art 1.) The method or system according to prior art 1 allows the user, in the planning and design stage where no media object is available, to define individual windows, to enter a multimedia project chart composed of rough sketches, comments, and so on with a tool similar to a drawing tool, and to specify the attributes such as display layouts, timing, and user interactions for the above multimedia project chart. It also allows the user to execute the multimedia project chart using specified attributes, thus making it possible for producers, scenario writers, and creators to share application images even in the initial development stage where no media object is available.

Also introduced is an application creation method in which media objects are associated with visual objects on a screen where a multimedia project chart is displayed. An example of this method is described in "Multimedia authoring system MediaDesc(2)—Scenario creation support, Draft proceedings 3F-5 for the 52nd national conference of Information Processing Society of Japan" (hereinafter referred to as prior art 2). Prior art 2 has introduced a scenario editing tool named "Storyboard Editor." With the Storyboard Editor, the user can create a null "slot" which temporarily represents a non-existing media object. During slot editing, the user can specify the contents of a slot, such as the layout of a media object on the screen, display timing, display effects, and comments. With specifically-designed slots displayed on the screen, the user uses a media browser or Explorer under control of Windows to drag and drop an icon or a thumbnail, representative of a media object, into one of the slots to cause the slot to associate with the media object. By doing so, the user substitutes the media object for the slot (hereinafter called media binding). This operation enables the user to create an application easily using a scenario described visually as a rough sketch.

In addition, a method in which no multimedia project chart is used has been introduced. In this method, a plurality of templates each describing the attributes such as screen layouts, media types, and screen-to-screen transitions are provided. An example of this method is described in "Proceedings of IEEE Multimedia '96, Extending Styles to Hypermedia Documents, pp. 417–424." This method also uses slots, similar to those used in prior art 2, for a hypermedia creation style template to make editing simpler (hereinafter referred to as prior art 3). Another example is the authoring tool named "CBT Express" introduced by AIMTEC for use in the education field; it provides the user with templates, each associated with a media layout and background, from which the user can select one best suited for his or her need to create an electronic or hard-copy version of a storyboard (hereinafter referred to as prior art 4).

In summary, the user uses one of known methods to create an application from a scenario seamlessly. To do so, the user types into a multimedia project chart or selects a template and then performs media binding through the drag-and-drop operation.

On the other hand, a special storyboard tool has been used in film production. For example, Storyboard Artist from Power Production provides the user with contents samples such as characters, props, and settings. The user can arrange these samples or capture moving video objects using Quick Time or some other program to visualize ideas or to confirm the result on a slide show (hereinafter referred to as prior art 5). However, it should be noted that the storyboard is for producing video applications only; the storyboard itself does not produce any application. Instead, in film production, a scheduling tool and a cost estimate tool for use in all the stages from script writing to shooting are available. For example, Movie Magic Scheduling from Screenplay Systems Inc. analyzes a text-base script, extracts scenes, and generates a shooting schedule (hereinafter referred to as prior art 6). Movie Magic Budgeting, also from Screenplay Systems Inc., references data produced by Movie Magic Scheduling and lists cost management information (cast, setting, props, etc.) (hereinafter referred to as prior art 7).

SUMMARY OF THE DISCLOSURE

According to the eager investigation towards the present invention the following points have been encountered.

First, it is important to estimate the size of data during multimedia application development. For example, for a client-server application for distribution on the World Wide Web, an amount of data larger than the communication capacity results in a slow response and poor application quality. Although it is necessary to estimate the application size before starting media creation in order to lower the development cost, as the scenario editing methods according to prior arts 1–7 do not have this function. For this reason, applications must be developed on a trial-and-error basis, with poor application quality and increased development costs.

It is also important to estimate the development manpower (e.g., development time) to lower the application development costs while maintaining the quality. The scenario editing methods according to prior arts 1–4 do not have this function. The film production methods according to prior arts 5, 6, and 7 provide the user with two separate abilities - - - the ability to create visual storyboards and the ability to schedule a film production project and estimate it cost - - - but not the integrated ability. Neither do they provide the scheduling and cost estimating ability for the concurrent creational operation of different media such as voices, moving pictures, still pictures, and so on. Therefore, a multimedia producer cannot keep track of the progress status of the whole production, with a possible result that scheduling and cost management are loose.

There is a further disadvantage. Namely, the scenario editing methods according to prior arts 1–7 do not have the revision management function or the history management function which is important for development management. For example, for top-down application creation through scenario-media binding, there are times when existing objects must be used temporarily for those not yet completed or when a need arises that one media object must be compared with another. This results in a plurality of versions. The methods according to prior arts, which manage neither versions nor history data, make application development management difficult.

There is much desired in the prior art. Accordingly, the present invention seeks to solve at least any of the problems associated with the prior arts described above. Still further objectives of the present invention will become apparent in the entire disclosure.

According to a first aspect of the present invention, there is provided a scenario editing system comprising a drawing input module drawing graphic media objects or inputting existing media objects; a scene management module storing and managing the media objects; a surrogate media management module storing said media objects for use as surrogate media objects temporarily representing actual moving picture objects, voice objects, or image objects to be created later; and a surrogate media list module displaying said surrogate media objects in a list of thumbnails. The scenario editing system further comprises a media attribute input module allowing a user to enter a media-dependent attribute of an actual media object to be created, while said surrogate media list module displays the list; a calculation module calculating sizes of actual media data and adding up the media data sizes to estimate a total size of an overall application; based on said media-dependent attribute; and a calculation result display module displaying the result of said calculation.

According to a second aspect the media attribute input module allows a user to enter the name of a person in charge and scheduled development time as an attribute, wherein the calculation module adds up actual media creation costs for calculation of an estimate of the cost of each media type and an overall application, and the calculation result display module displays cost information for each media type and for the overall application.

According to a third aspect, the system further comprises a corresponding media version management module, wherein the surrogate media list module (a) allows a user to drag and drop an icon or a thumbnail, representing a media file, onto one of surrogate media thumbnails to replace the surrogate media thumbnail, (b) stores information on the replacing media file in the corresponding media version management module for use as version information, and (c) changes the version of the surrogate media thumbnail in response to a user request.

According to a fourth aspect the media attribute input module allows a user to enter a category attribute as a media-dependent attribute, wherein the calculation module compares the number, size information, and cost information of completed and associated actual media objects with a total number, size information, and cost information of surrogate media objects to calculate a progress category by category and a progress of overall application development, and wherein the calculation result display module displays a result of said calculation.

The media-dependent attribute includes size, display color depth, sampling rate, duration, and compression ratio of the actual media object to be created.

PREFERRED EMBODIMENTS

In the first aspect, an embodiment of the scenario editing system comprises:

means for drawing graphic media objects or receiving existing media objects;

means for storing and managing said media objects in units of scenes;

means for storing and managing said media objects as surrogate media objects temporarily representing actual media objects including moving picture objects, voice objects, and/or image objects;

means for displaying said surrogate media objects in a list of thumbnails;

means for allowing a user to enter media-dependent attributes, such as size, display color depth, sampling rate, duration, and compression ratio of an actual media object to be created, while said surrogate media list means displays the list;

means for calculating the size of each piece of media data, estimating the size of each type of media data, and estimating the total size of an application; and means for displaying the result of said calculation.

In the second aspect, an embodiment of the scenario editing system comprises:

means for drawing graphic media objects or receiving existing media objects;

means for storing and managing said media objects;

means for storing and managing said media objects as surrogate media objects temporarily representing actual media objects including moving picture objects, voice objects, and/or image objects;

means for displaying the surrogate media objects in a list of thumbnails;

means for allowing a user to enter a media-dependent attribute, such as size, display color number, sampling rate, duration, compression ratio, person in charge, and creation time of an actual media object to be created, while said surrogate media list means displays the list;

means for estimating the size of each type of media data and estimating the total cost of an application; and means for displaying the result of the estimation.

In the third aspect, an embodiment according to the present invention comprises:

means for drawing graphic media objects or receiving existing media objects;

means for storing and managing said media objects;

means for storing and managing said media objects as surrogate media objects temporarily representing actual media objects including moving picture objects, voice objects, and/or image objects;

means for displaying the surrogate media objects as a list of thumbnails, for allowing a user to drag and drop an icon or a thumbnail, representing a media file, onto one of said surrogate media thumbnails to establish an association between them and to replace said displayed surrogate media thumbnail, and, at a later time, for changing said surrogate thumbnail in response to a user request;

means for storing and managing version information on said associated media file;

means for allowing a user to enter a media-dependent attribute of an actual media object to be created, while said surrogate media list means displays the list;

means for estimating the size and cost of an application based on said media-dependent attribute; and means for displaying the result of said estimation.

In the fourth aspect, an embodiment according to the present invention comprises:

means for drawing graphic media objects or receiving existing media objects;

means for storing and managing said media objects;

means for storing and managing said media objects as surrogate media objects temporarily representing actual media objects including moving picture objects, voice objects, and/or image objects;

means for displaying said surrogate media objects as a list of thumbnails, for allowing a user to drag and drop an icon or a thumbnail, representing a media file, onto one of said surrogate media thumbnails with the use of a media browser etc. to establish an association between them and to replace said displayed surrogate media thumbnail, and, at a later time, for changing said surrogate thumbnail in response to a user request;

means for storing and managing version information on said associated media file;

means for allowing a user to enter a media-dependent attribute of an actual media object to be created and a category attribute for progress level calculation, while said surrogate media list means displays the list;

means for comparing the number, size information, and cost information of associated and completed actual media objects with the total number, size information, and cost information of surrogate media objects and for calculating a progress by category and a progress of overall application development, based on said media-dependent attribute; and means for displaying the result of said calculation.

In the following the meritorious effects of the present invention will be summarized aspect by aspect, which, however, is not restrictive.

The first aspect of the scenario editing system according to the present invention allows the user to estimate the data size of a multimedia application in the scenario creation stage. This helps the user determine, in an early stage of application development, whether the application will be able to reside on a CD-ROM or whether data transfer speed will become a bottleneck.

The second aspect of the scenario editing system according to the present invention allows the user to estimate the cost of multimedia application development, such as a development time, in the scenario creation stage, making scheduling easy.

The third aspect of the scenario editing system according to the present invention makes the history management and version management of the correspondence between surrogate media objects and bound media objects. This expedites media object creation and enables the user to visually keep track of media object creation progress.

The fourth aspect of the scenario editing system according to the present invention informs the user of the development progress by media type or person in charge as well as the development progress of overall application, keeping the user informed of the progress numerically.

DETAILED DESCRIPTION OF THE PREFERRED EMBODIMENTS

Referring to the attached drawings, there are shown preferred embodiments of the present invention.

First Embodiment (First aspect)

Figure 1:
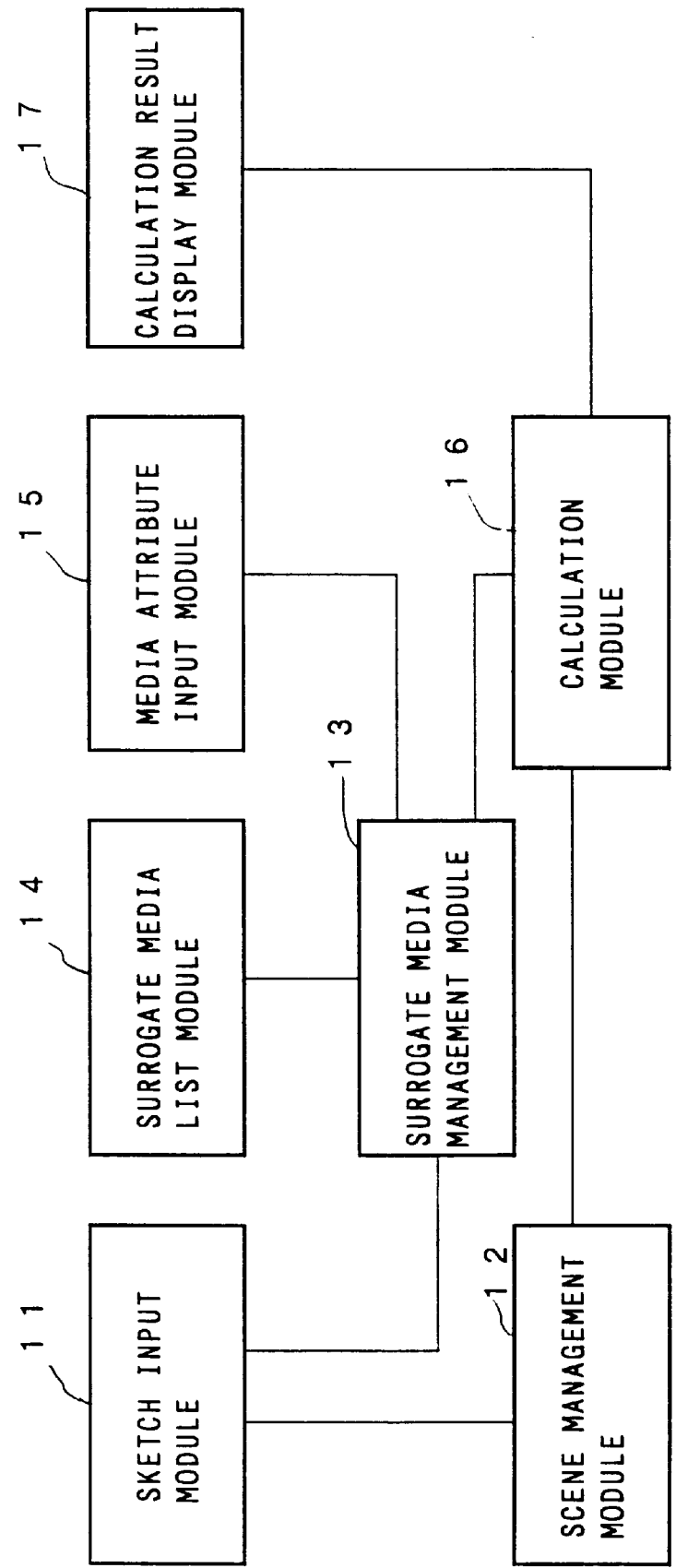
FIG. 1 is a block diagram showing a configuration of a first embodiment of a scenario editing system according to the present invention.

FIG. 1 is a block diagram of a first embodiment according to the first aspect of the present invention. It is assumed that this embodiment runs on a computer system with the multi-window capability, that the computer stores media objects in files, and that Media Browser or File Manager (or Explorer in Windows95) has been started to allow the user to display a list of those files. It is also assumed that the user can drag a media icon or a thumbnail with a mouse on a File Manager screen and drop it within a window of the editor to open a media file.

In this embodiment, the following scenario description units as used in prior art 2 are used: a "scene" which is a screen display unit and a "slot" which is a media description unit within a scene. The user can create a slot in a scene to specify a media type or size, or draw graphics (sketch) to describe the contents, even when actual media objects are not available. In addition, the user can bind an existing media object to a slot as a temporary surrogate media object. As the size attribute of a slot, the user can specify a data format (type), data size, link information, the name of surrogate media object to be bound, and so on.

The ability to use not only a sketch but also an existing media object as a surrogate media object has brought many editing advantages to the user. For example, the user can create a new picture based on an already-created picture, temporarily use a still picture instead of a music or moving picture object, or use existing data of the same duration to set rough scene display timing.

To implement these functions, a scenario document used in this embodiment is structured hierarchically, the structure being composed of five types of object - - - scenario, group scene, scene, slot, and surrogate media object - - - from top to bottom. A surrogate media object, the last object, is a description unit introduced by the present invention. In each stage, the following objects and their attributes are defined:

Scenario object

Attribute: Scene name, and an array of group scene names
Pointer to a surrogate media object array The group scene refers to a group of scenes arranged in an array with a format (scene 1, scene 2, . . . ).

Independently of the scenario, the pointer to the surrogate media object array allows the user to reference and manage the surrogate media objects to be used in the scenario. An example of scenario coding is:

Sample Scenario
Scene: Scene1, GroupScene1, Scene2, Scene3, Groupscene2
Surrogate media: Surrogatemedia1*

Surrogatemedia1* is a pointer to the array Surrogatemedia1*

Group scene object (display screen group description unit)

Attribute: Scene name, and an array of group scene names

An example of group scene object coding is:
Sample Group Scene
Scene: Scene11, Scene12, Scene13, Groupscene11

A group scene is described in the same manner as a scenario. It is described as a tree structure in which a scenario object is the root and a group scene is a node.

Scene object (screen description unit)
Attribute: Scene name
An array of slot names The scene object is a basic unit of screen description. An example of scene object coding is:
Sample Scene
    Slot: Slot1, Slot2, Slot3
    Slot object (media description unit)
Attribute: Slot name
    Display location (x, y)
    Display size (dx, dy)
    Display duration (dt)
    Display-deletion time visual effect attribute
    Link information
    Corresponding surrogate media object name The slot object is a media display unit. It has information as to how a media object is to be displayed on the screen (layout, timing, visual effect, link information). The link information specifies an action to be taken when an event associated with the slot occurs (for example, jump to another scene when the user clicks the mouse button). An example of slot object coding is:
Sample Slot1
    position: x1, y1
    slot size: dx1, dy1, dt1
    in-effect: fade-in, duration: 1sec
    out-effect: fade-out, duration: 1sec
    link
        event: mouse left button click
        action: jump
        destination: Scene10
    Surrogate media: Surrogate1

In the above coding, the "in-effect" line specifies that, when SampleSlot1 is displayed, the fade-in visual effect is to last one second, and the "out-effect" line specifies that the fade-out visual effect is to last one second. The "link" line specifies that control is to jump to Scene10 when an event is caused by the user clicking the left button of the mouse in SampleSlot1.

Surrogate media object (detailed specification description unit)

Attribute: Surrogate media name
    Media type
    Sketch information list
    Bound media name
    Temporary flag
    Current flag
    Size information list (display size, display duration, file size, compression ratio, etc.)

The surrogate media object is used to describe the detail about sketch information to be drawn in a slot and about a media object to be bound. This object is generated when a new slot object is generated. The temporary flag indicates whether the object is under editing (only a sketch is edited, or a temporary media is bound) or editing is completed (a completed media is bound). The current flag indicates whether the slot on the screen is a sketch or a bound media object. The size information list contains media object information such as the display size of the media object to be bound and the display duration. It also contains detailed media-type-dependent information such as a compression ratio, display color depth, or sampling rate.

Figure 5:
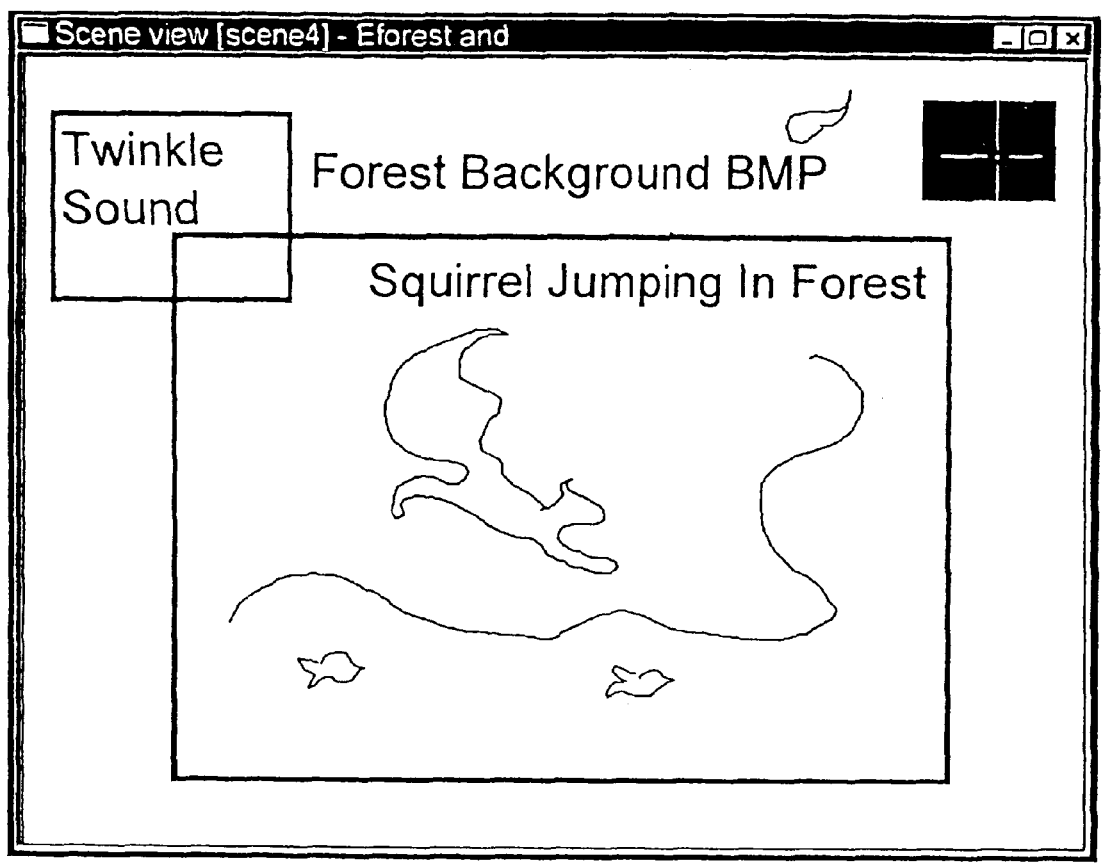
FIG. 5 is an example of a scene editing screen used in a sketch input module 11.

The attribute of a surrogate media object is explained with reference to FIG. 5. FIG. 5 shows a scene screen being under editing. The rectangle in the center is a slot which contains one text (Squirrel Jumping In Forest) and four free curve graphics. Sketch information is represented by a set of values (graphic type, coordinate array, and, for text, character string). When a media object is not yet bound to this slot, the temporary flag is 1, indicating that the object is under editing. When a completed media object is bound, the flag is 0 (editing completed). The flag may contain any other value provided the on-off status may be identified.

On the other hand, the current flag is 0, indicating that a sketch is displayed. (The flag contains 1 when a bound media is displayed. The flag may contain any other value provided the on-off status may be identified). The size attribute has default values composed of the media type of the surrogate media object and the display size and display duration of the corresponding slot object). In summary, the attribute of the surrogate media object corresponding to the slot in the center of the figure is coded as follows:

| | |
|---|---|
| Surrogate1 | (Surrogate media name) |
| Sketch list | (Sketch list) |
|   type: text | position:x1, y1, "Squirrel Jumping In Forest", (text string) |
|   type: closed line, position: (x21, y21), (x22, y22), (x23, y23) . . ., (closed line locus coordinates) | |
|   type: closed line, position: (x31, y31), (x32, y32), (x33, y33) . . ., | |
|   type: closed line, position: (x41, y41), (x42, y42), (x43, y43) . . ., | |
|   type: closed line, position: (x51, y51), (x52, y52), (x53, y53) . . ., | |
| Bound media: null (no bound media) | |
| Temporary flag: 1 | (object being edited) |
| Current flag: 0 | (sketch) |
| Size list | (size information list) |
|   type: AVI | (surrogate media object type) |
|   size: DXa, DYa | (slot display size) |
|   duration: Dt | (slot display duration) |
|   color depth; 8 | (default for number of colors 8 bits = 256 |

-continued colors)
frame rate: 15  (default for number of frames/second)
compression ratio:  0.1 (default for compression ratio)

Although no media object is bound to the slot, an AVI moving picture is specified for the type and the default values for the type are assigned to the size attribute.

In the upper-right corner in FIG. 5 is displayed a slot to which a bit-mapped image is temporarily bound. The current flag is 1, indicating that a media object is bound to the slot. The size information is specified based on the bound media object. An example of coding for the surrogate media object is:

```
Surrogate2
Sketch list
  type: text, position: x2, y2, "star illustration" (comment stating
  that a star illustration is to be inserted)
  Bound media: STAR.BMP (name of file bound)
  Temporary flag: 1 (being edited)
  Current flag: 1   (bit-mapped image displayed)
  Size list
    type: BMP
    size: DXb, DYb  (slot display size)
    duration: null (no duration specified = infinite)
    compression ratio: 1.0
    color number: 8 (number of colors 8 bits = 256 colors)
```

Referring to FIG. 1, there is shown an operation of the present invention. In the following discussion, the description format given above is used:

1. Sketch Input Module 11

A sketch input module 11 displays a scene editing screen on the display to allow the user to enter a sketch or to bind a media object which is used temporarily to a slot. To do so, the module displays a slot creation menu for each media type and graphic drawing menu on the scene editing screen.

Figure 9:
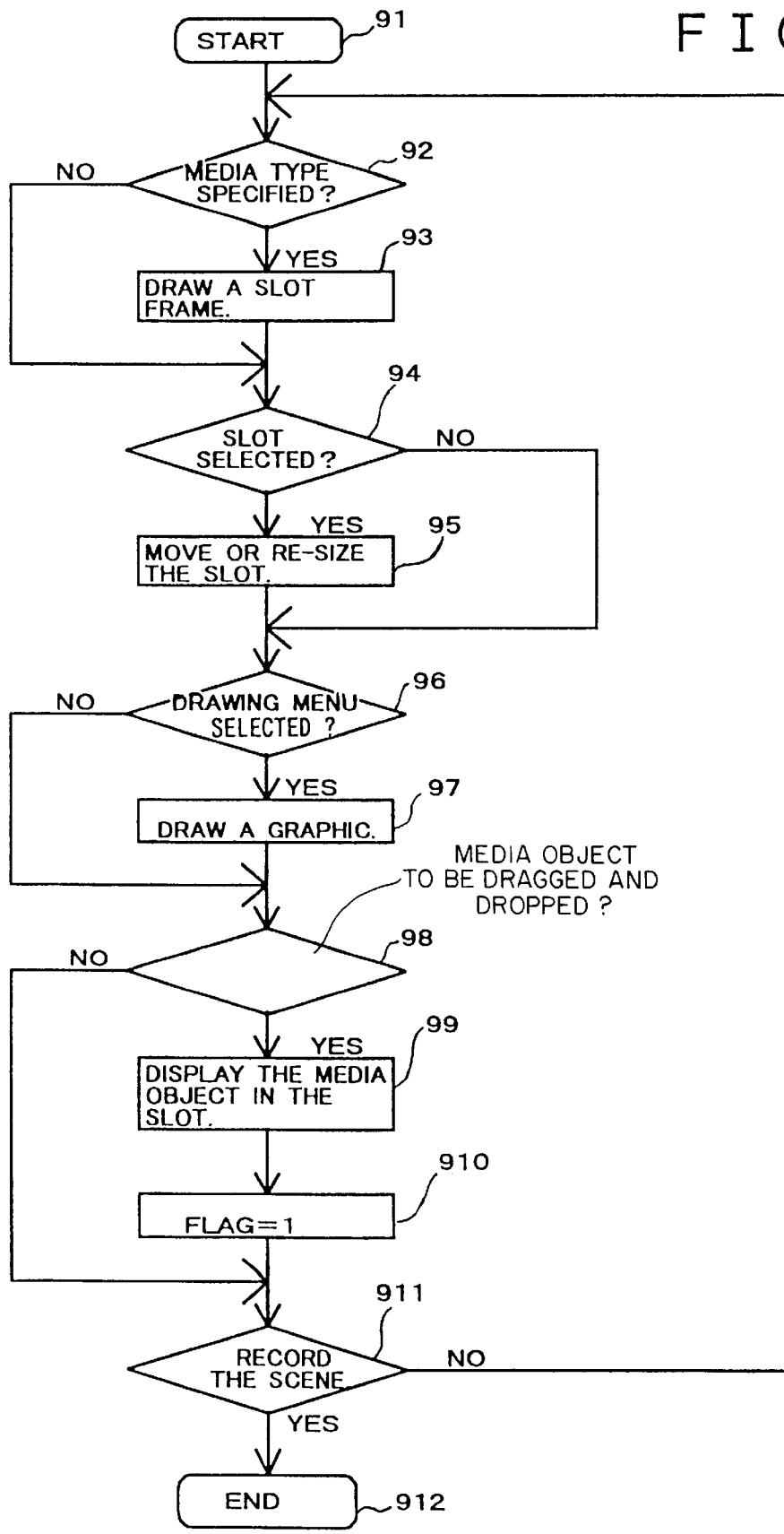
FIG. 9 is an example of a flowchart showing the operation of a sketch input module 11.

More specifically, the module performs operation according to the flowchart shown in FIG. 9. The editing operations, such as scene creation, slot display timing specification, and link specification, are not explained here because they are already known.

(1) Generates a slot object and a surrogate media object if the user selects a media type from the slot creation menu. Otherwise, the module passes control to step 94 (step 92).

(2) Draws a slot frame of a specified size at a specified position on the scene screen (step 93).

(3) Moves or re-sizes (change the size) the slot if the user moves the mouse to do so and records the slot size (display size on the screen) in the slot object (steps 94 and 95). Otherwise, the module passes control to step 96 (step 94).

(4) Draws an entered sketch or displays an entered comment in the slot as directed by the user via the mouse or keyboard when the user selects the graphic drawing menu (rectangle, circle, ellipse, free curve, text etc.) (step 96), and sets the current flag of the slot object to 0 (step 97). The module writes drawing information into the sketch information list of the surrogate media object. When the user does not select the drawing menu, the module passes control to step 98 (step 96).

(5) Passes control to step 99 if the user wants to perform drag-and-drop operation on a slot in order to bind the media object to the slot. Otherwise, the module asses control to 911 (step 98).

(6) References a media file to be bound and displays the contents in the slot frame. The module writes the name of the referenced file into the bound media name attribute field of the surrogate media object (step 99).

(7) Sets the temporary flag of the surrogate media object to 1 (under editing), and the current flag to 1 (display bound media object) (step 910).

(8) Records the slot object in a scene management module 12, and the surrogate media object in a surrogate media management module 13, if the user selects a scene addition menu (steps 911 and 912). Otherwise, the module passes control back to step 92 (step 912).

Although, in FIG. 9, a scene is recorded and, at the same time, processing ends, processing may be continued until the user selects a menu such as a scene editing end menu.

2. Scene management module 12

This module contains created scene objects and slot objects. As described before, a scene object is in the format:
Scene Name
  Slot name 1, slot name 2, slot name 3,
A slot object is in the format:
Slot Name
  Display position (x, y)
  Pixel-basis display size (dx, dy)
  Display duration (dt)
  Display-deletion visual effect attribute
  Link information
  Corresponding surrogate media name 3. Surrogate Media Management Module 13

This module contains surrogate media objects created by the sketch input module 11. The format is as shown in the example in FIG. 5.

4. Surrogate Media List Module 14

Figure 10:
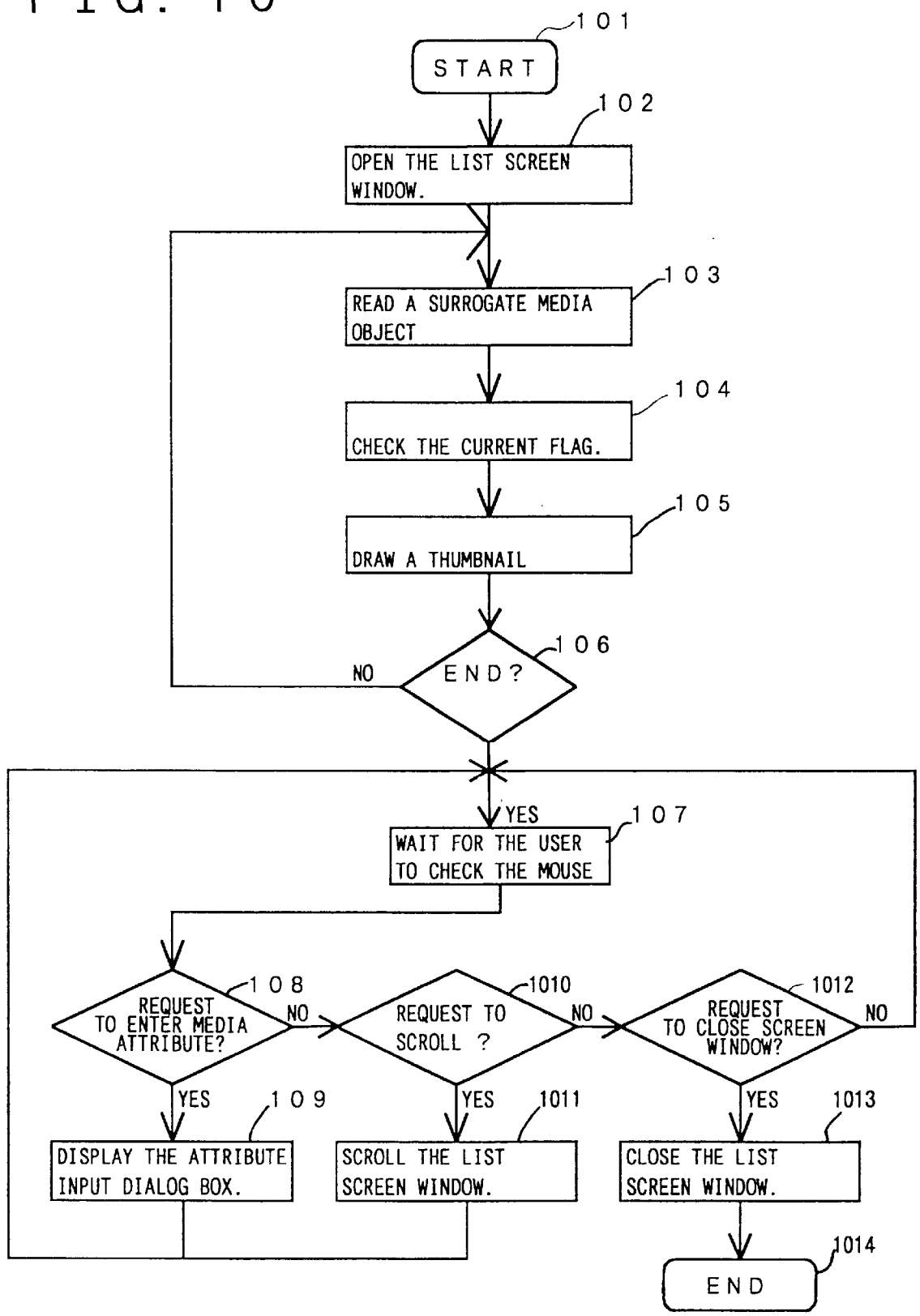
FIG. 10 is an example of a flowchart showing the operation of a surrogate media list module 14.

This module creates thumbnails of the surrogate media objects recorded in (added to) the surrogate media management module 13, and displays a list of thumbnails. More specifically, the module operates as follows according to the flowchart shown in FIG. 10.

(1) Opens a thumbnail list screen window. (step 102)

(2) Reads objects from the surrogate media management module 13, one at a time, in order of surrogate media names (identifiers), and checks the current flag (steps 103 and 104).

(3) References sketch drawing information when the current flag is 0, or references the bind media file when the current flag is 1, creates a thumbnail, and draws it in a free area in the window (step 105).

(4) Passes control to step 107 if all the objects are read. Otherwise, the module passes control back to step 103 (step 106).

(5) Waits for the user to click the mouse (step 107).

(6) If the user clicks on a specific thumbnail, the module assumes that the user requests to enter a size attribute request for the corresponding surrogate media object and requests the media attribute input module 15 to display an attribute entry dialog box (steps 108 and 109). Otherwise, the module passes control to step 1010.

(7) If the user requests to scroll the window, the module scrolls the list screen as directed by the user via the mouse (steps 1010 and 1011). Otherwise, the module passes control to step 1012.

(8) If the user requests to close the window, the module closes the list screen window and ends processing (steps 1012, 1013, and 1014). Otherwise, the module passes control to step 107 and waits for the user to click the mouse.

Figure 6:
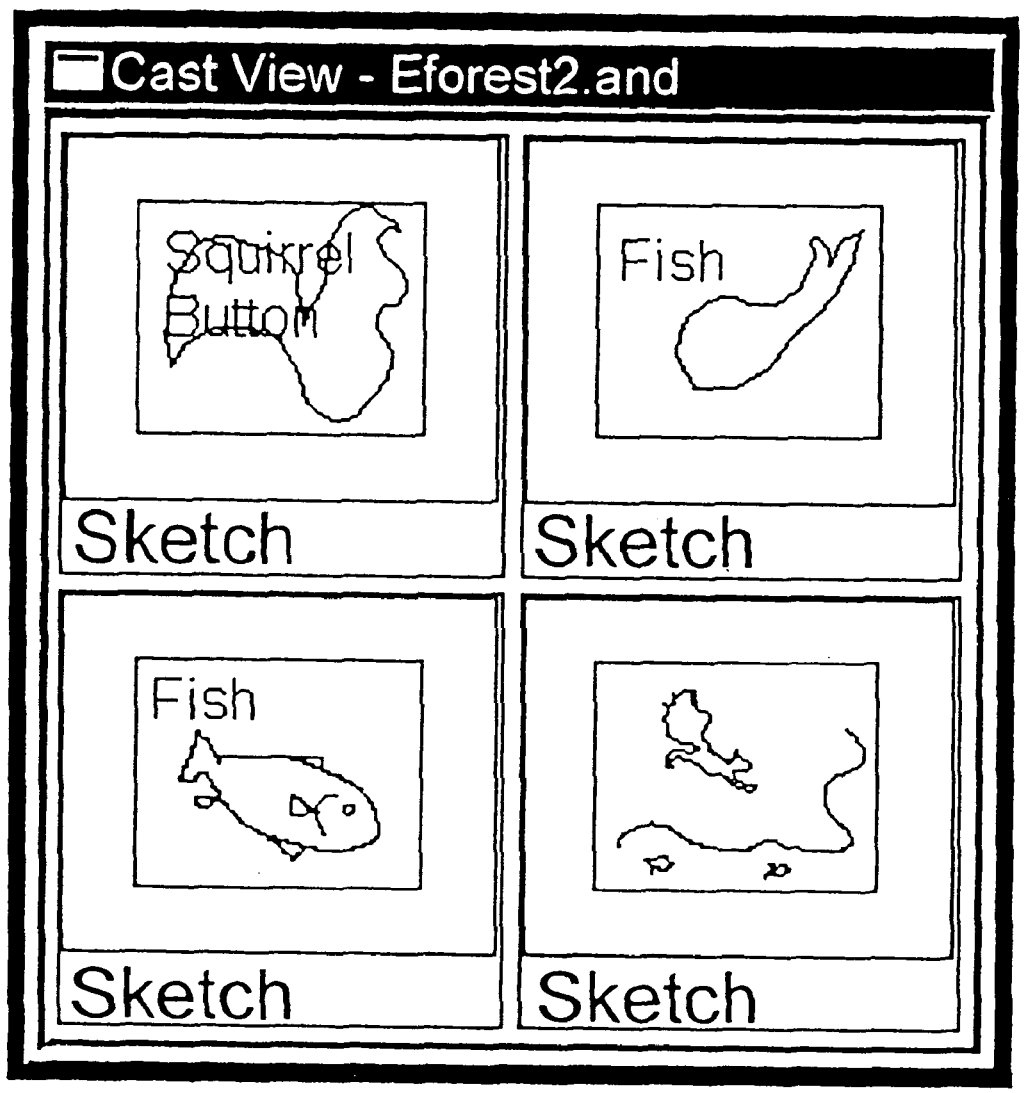
FIG. 6 is an example of thumbnails displayed by a surrogate media list module 14.

In the processing shown in the flowchart, the module may in any order check whether the user will enter an attribute, whether the user will scroll the window, or whether the user will close the window. When displaying a thumbnail, the module may display its name in the thumbnail display area. FIG. 6 shows an example of a screen displayed by the surrogate media list module 14. In FIG. 6, surrogate media formed only of sketches are displayed in thumbnails with the name of "Sketch". When the current flag is 1 (that is, a media object is bound), the module displays a thumbnail for a file, such as an image file, and displays the media file name in the area where "Sketch" is displayed in the example. For a file for which a thumbnail cannot be created (e.g., a sound file), the module displays an icon, such as a musical note representing a sound file (referred to as voice file), as well as the file name.

5. Media Attribute Input Module 15 When the user clicks on a thumbnail in FIG. 6 as described in (6) above, the module displays the media attribute information entry dialog box. In the dialog box, the media type for the corresponding surrogate media object as well as the defaults for the media display size will be displayed, which can be changed by the user. At the same time, the user may specify any of the following attributes for each media type and enter a value for it. Typical attributes and their default values are shown below. The media attribute input module 15 initializes the default values of each media type.

| Media type | Attribute | Default value |
| --- | --- | --- |
| Still picture | Display color depth (No. of bits) | 8 (256 colors) |
| | Compression ratio | 1.0 (no compression) |
| Moving picture | Display color number (No. of bits) | 8 |
| | Frames/second | 15 |
| | Display duration (seconds) | Not set |
| | Compression ratio | 0.1 |
| Voice | No. of channels | 1 |
| | Sampling rate | 8 KHz |
| | No. of bits | 16 |
| | Display duration (seconds) | Not set |
| | Compression ratio | 1.0 (no compression) |

In addition, the user may add other attributes, such as a name of creator etc., and specify attribute values for them. A media attribute value typed in the dialog box is written into the surrogate media management module 13 as a value to be included in the size information list.

6. Calculation Module 16

Figure 11:
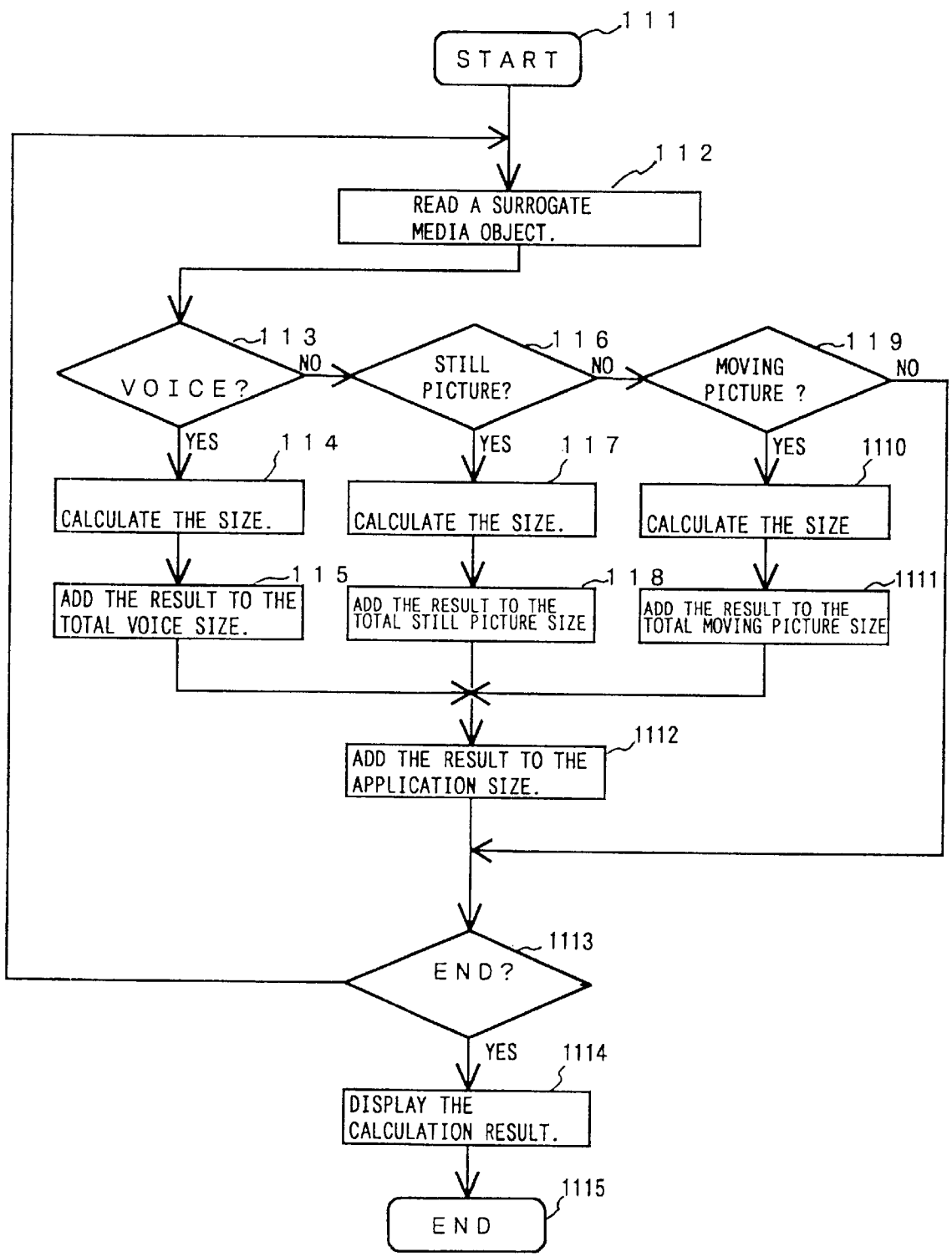
FIG. 11 is an example of a flowchart showing the operation of a calculation module 16.

This module reads media attribute information from the surrogate media management module 13 and calculates the data size of each object according to the flowchart shown in FIG. 11.

(1) Reads surrogate media objects, one at a time, from the surrogate media management module 13 and checks the media type attribute (step 112).

(2) Calculates the size using the following formula (steps 113 and 114) if the object is a voice object. Otherwise, the module passes control to step 116.

Voice data size=No. of channels×No. of bits/8×No. of samples× Compression ratio where, No. of channels=1 (monaural) or 2 (stereo)

No. of bits=8 or 16

No. of samples=(Sampling rate)×(Duration in seconds)

(3) Adds the calculation result to the total voice data size (initial value=0). (step 115)

(4) Calculates the size using the following formula if the object is a still picture object (steps 116 and 117). Otherwise, the module passes control to step 119.

Still picture data size=Screen display size×No. of bits/8×Compression ratio where, No. of bits=4 (16 colors), 8 (256 colors), 24 (full color)

(5) Adds the calculation result to the total still picture data size (initial value=0). (step 118)

(6) Calculates the size using the following formula if the object is a moving picture object. (steps 119 and 1110). Otherwise, the module passes control to step 1113.

Moving picture data size=Screen display size×No. of bits/8×No. of frames×Compression ratio where, No. of frames=(frames/second)×duration (7) Adds the calculation result to the total moving picture data size (initial value=0). (step 1111)

(8) Adds the calculation result to the application data size (initial value=0). (step 1112)

(9) Goes back to step 112 if all the surrogate media objects are not yet read. (step 1113)

(10) Outputs the calculation result on the calculation result display module 17, and ends processing (steps 1114 and 1115)

In the processing shown in the flowchart, the module may check the type of media (voice, still picture, moving picture) in any order. In addition, the application size may be calculated after step 1113; in that case, the application size is calculated as (total voice data size+total still picture size+total moving picture size).

The application data size depends largely on how much voice data, still picture data, and moving picture data will be used. Therefore, the flowchart shown in FIG. 11 does not include the calculation of the text, graphic, and scenario file sizes etc. For the graphic and scenario files, it is possible to use formulas to find approximate sizes. It is also possible for the user to specify a particular media type file and to calculate the size of that file.

It is also possible to refer to the scene information stored in the scene management module 12 to find the data size for each screen as follows:

Data size for each scene=Application data size/No. of scenes

This value may be used as a transfer data amount estimate when the user downloads a network-distributed application, on the basis of one scene at a time.

7. Calculation Result Display Module 17

This module displays data size information, calculated by the calculation module 16, for each media type and for the overall application.

In the flowchart of the sketch input module 11 in the above embodiment, the user selects an object from the "slot creation" menu to create a slot object and a surrogate media object one by one. It is also possible for the user to draw a whole screen sketch first, select any desired one or more graphics, and then record the selected objects as slot objects or surrogate media objects.

Second Embodiment (Second aspect)

Figure 2:
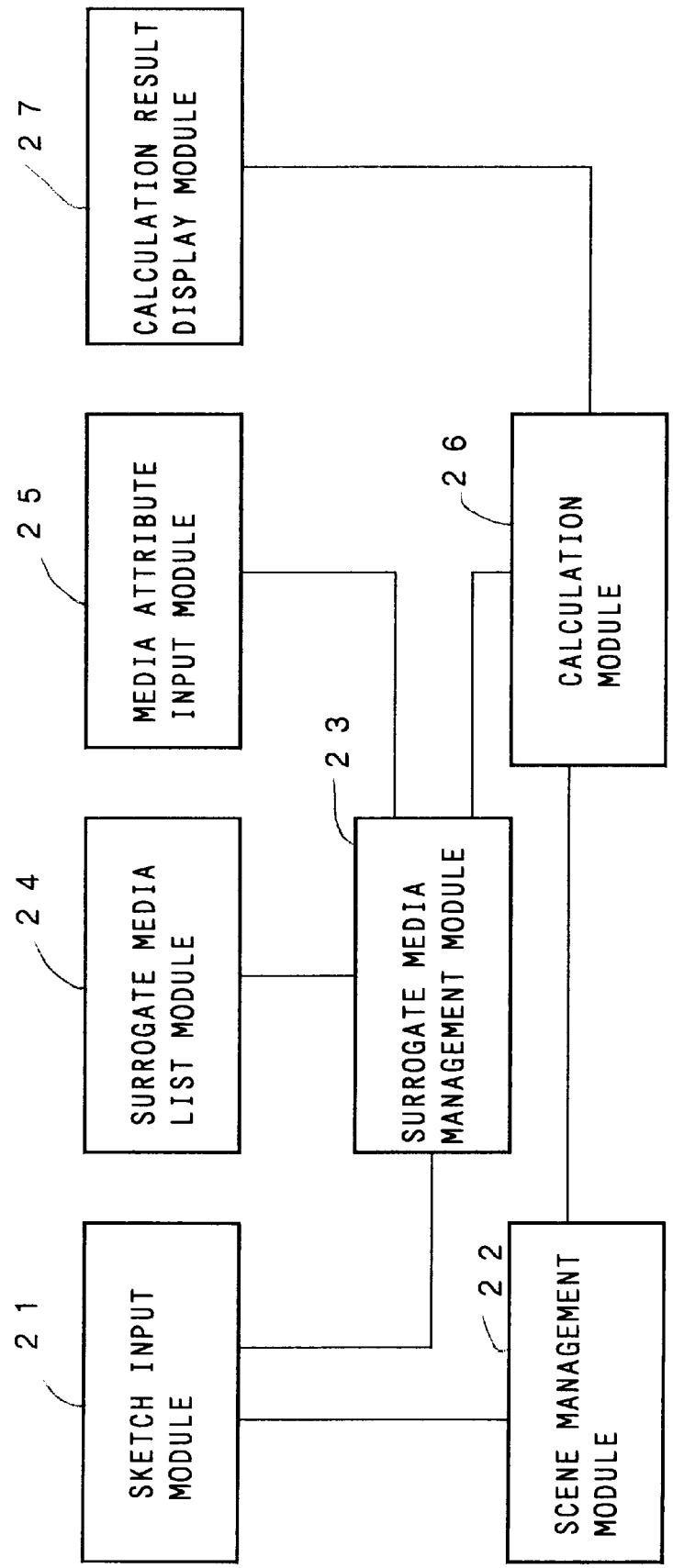
FIG. 2 is a block diagram showing a configuration of a second embodiment of a scenario editing system according to the present invention.

A second embodiment has the advantage of the first embodiment and, in addition to it, allows the user to estimate costs. The second embodiment is shown in FIG. 2.

The configuration and operation of each of the following means are the same as those of the first embodiment:

Sketch input module 21

Scene management module 22

Surrogate media management module 23

Surrogate media list module 24

A media attribute input module 25 allows the user to enter new attribute values in addition to those used in the first embodiment. The new attribute values include the name of a person in charge, scheduled development time, development start date, development end date, and cost per hour. To accept these values, a cost information list is added to the surrogate media object as follows:

Surrogate media object attribute
- Surrogate media name
- Media type
- Sketch information list
- Bound media name
- Temporary flag
- Current flag
- Size information list
- Cost information list (name of a person in charge, scheduled development time, development start date, development end data, cost per hour)

For example, the surrogate media object Surrogate2 in the first embodiment is expanded as follows:

Surrogate2
- Sketch list: (type: text, position: x2, y2, "star illustration")
- Bound media: STAR.BMP
- Temporary flag: 1
- Current flag: 1
- Size list (type: BMP, size: DXb, DYb, duration: null, compression ratio: 1.0, color depth: 8)
- Cost list (cost information list)
  - Person in charge: John
  - Scheduled time: 5
  - Start date: April 1
  - End date: April 3
Cost per hour: 100

In the above example, the surrogate media object Surrogate2 specifies that it will take for John, the person in charge, five hours to complete a bit map, beginning on April 1st and ending on April 3rd. The cost per hour is 100 dollars.

A media attribute input module 25 displays an entry dialog box to allow the user to enter cost information items (name of a person in charge, scheduled development time, development start date, development end date, cost per hour).

The calculation module 26 calculates the size as in the first embodiment and, in addition, the development cost of the application. This embodiment performs operation according to the flowchart shown in FIG. 12 with the development time as the base to calculate the development cost.

(1) Reads surrogate media objects, one at a time, from the surrogate media management module 23 and checks the media type attribute (step 122).

(2) Calculates the cost using the following formula (steps 123 and 124) if the object is a voice object. Otherwise, the module passes control to step 126.

Voice data development cost=Scheduled development time×Cost per hour where, the cost per hour is a fixed value.

(3) Adds the calculation result to the total voice development cost (initial value=0). (step 125)

(4) Calculates the cost using the following formula if the object is a still picture object (steps 126 and 127). Otherwise, the module passes control to step 129.

Still picture media development cost=Scheduled development cost×Cost per hour where, the cost per hour is a fixed value.

(5) Adds the calculation result to the total still picture development cost (initial value=0). (step 128)

(6) Calculates the size using the following formula if the object is a moving picture object. (steps 129 and 1210). Otherwise, the module passes control to step 1213.

Moving picture development cost=Scheduled development time×Cost per hour where, the cost per hour is a fixed value.

(7) Adds the calculation result to the total moving picture development cost (initial value=0). (step 1211)

(8) Adds the calculation result to the application development cost (initial value=0). (step 1212)

(9) Goes back to step 122 if all the surrogate media objects are not yet read. (step 1213)

(10) Outputs the calculation result on the calculation result display module 27, and ends processing (steps 1214 and 1215).

Figure 12:
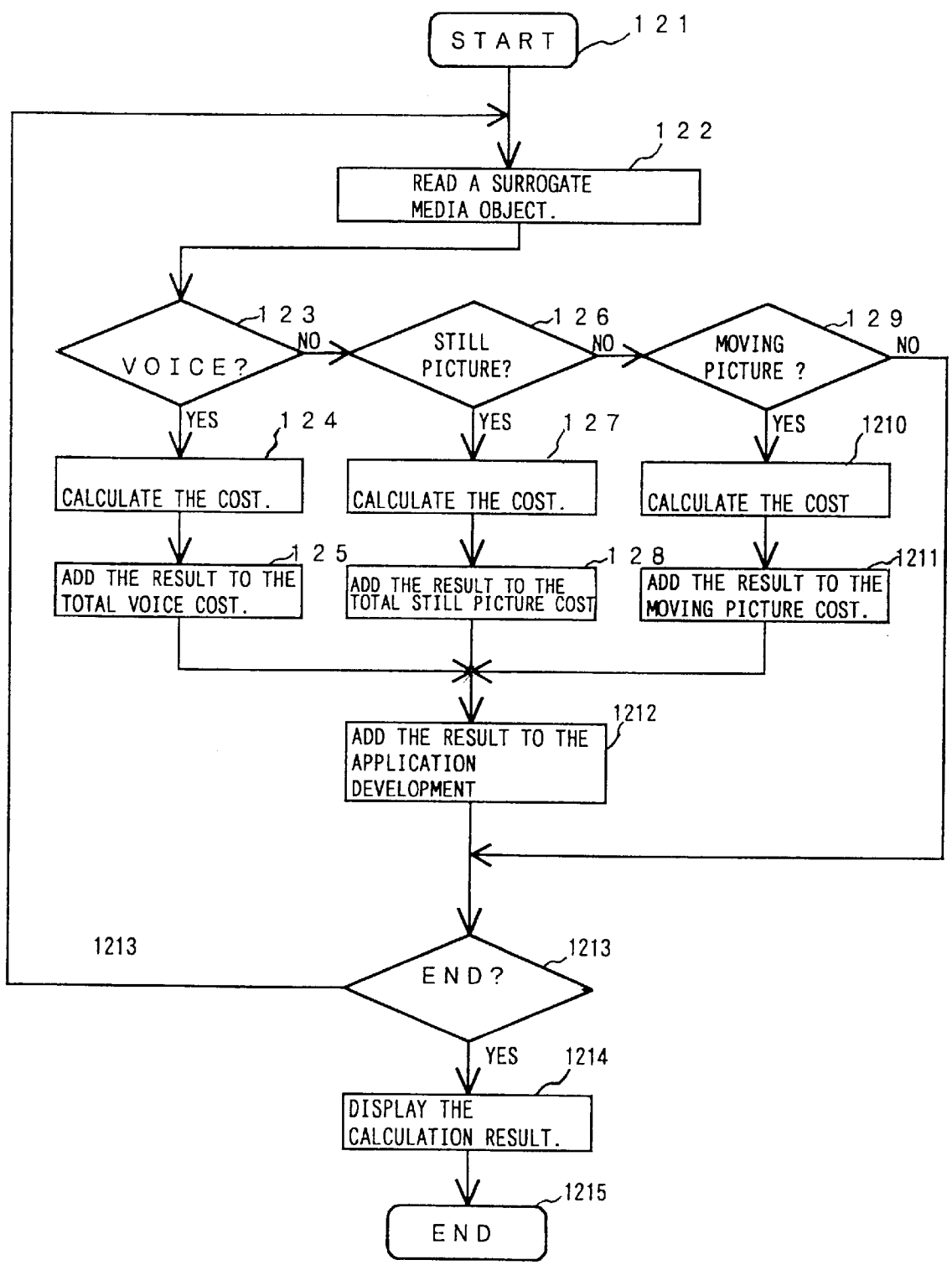
FIG. 12 is an example of a flowchart showing the operation of a calculation module 26.

In the processing shown in the flowchart in FIG. 12, the module may check the type of media (voice, still picture, moving picture) in any order as in FIG. 11. It is also possible for the module to accept other type of media object or calculate the costs only for user-selected media types. In the flowchart in FIG. 12, the calculation module 26 sets a fixed value for the cost per hour. It is possible for the media attribute input module 25 to allow the user to enter a cost for each creator or designer for use in calculation.

The calculation result display module 27 displays the costs calculated by the calculation module 26: i.e., the cost for each media type and the cost for the overall application. When the module calculates the cost for each creator or designer, the module displays the cost for each creator or designer.

Third Embodiment (Third aspect)

Figure 3:
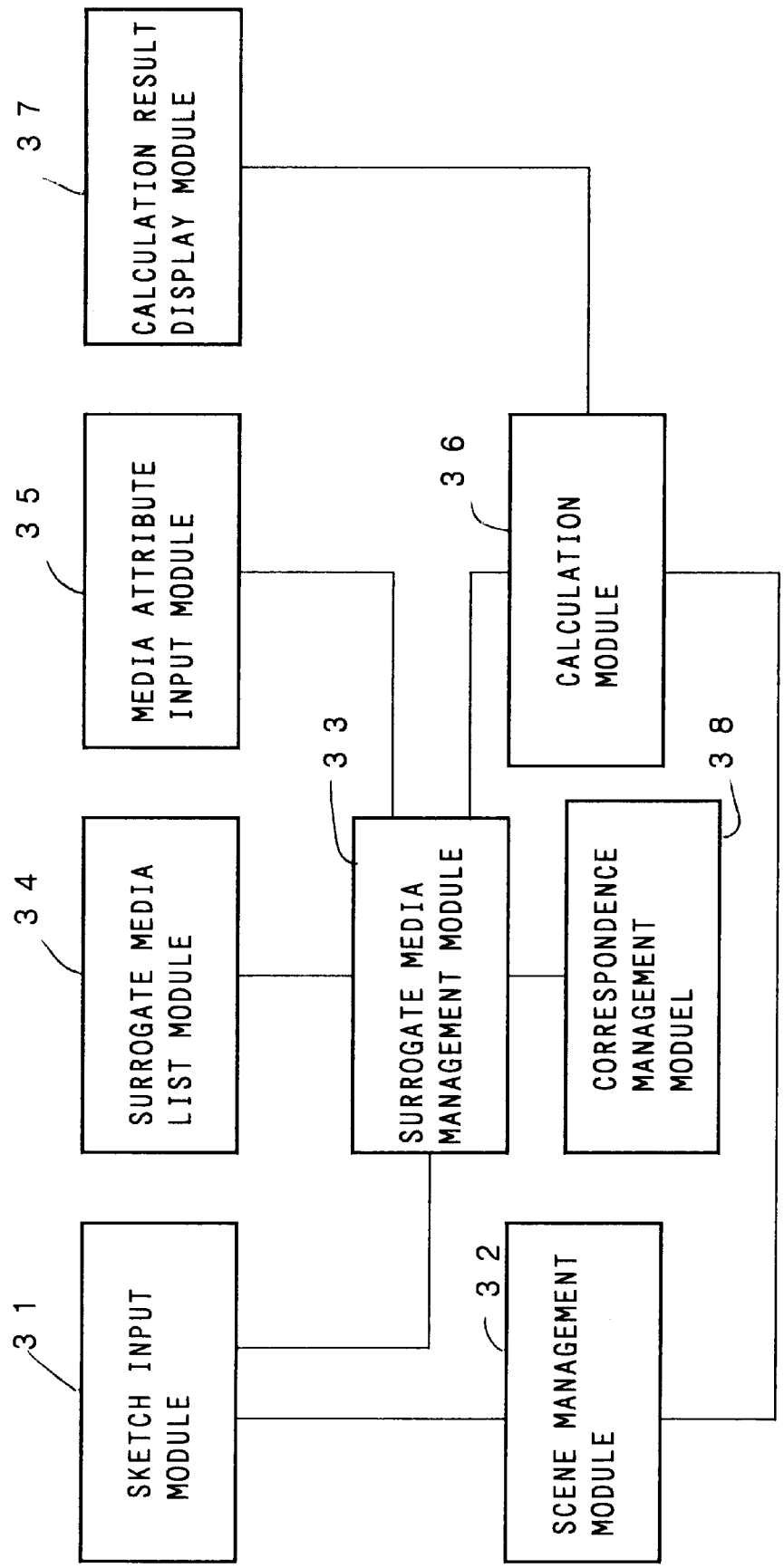
FIG. 3 is a block diagram showing a configuration of a third embodiment of a scenario editing system according to the present invention.

A third embodiment has the advantage of the second embodiment and, in addition, allows the user to bind a plurality of media objects to a surrogate media object, making media-bind update history management and version (revision) management easy. This function is highly efficient when sequentially binding an intermediate-stage media object for further modification or when binding a different media object to the same surrogate media object for comparison. The third embodiment is shown in FIG. 3.

The configuration and the operation of each of the following means are the same as those of the second embodiment:

Sketch input module 31
Scene management module 32
Media attribute input module 35
Calculation module 36
Calculation result display module 37

A correspondence management module 38, a new module, contains information on the correspondence of media objects that are bound to surrogate media objects in order to make media bind history management and version management easy. To do so, the module gets sketch information, bind media names, current flags, and temporary flags from surrogate media information stored in the surrogate media management module 33, and stores them in the correspondence management module 38 separately. The description format of a surrogate media object in the surrogate media management module 33 is as follows:

Surrogate media object attribute

Surrogate media name
Correspondence information list object name
Size information list
Cost information list For example, the description of Surrogate2 in the second embodiment is expanded as follows:

Surrogate2
  Revision: Revision1
  Size list (type: BMP, size: DXb, DYb, duration: null, compression ratio: 1.0, color number: 8)
  Cost list (Person in charge: John, Scheduled time: 5, Start date:
  April 1, End date: April 3 Cost per hour: 100)

where, Revision1 is the name of a correspondence information list object.

A correspondence information list object in the correspondence management module 38 is described as follows:

Correspondence information list object attribute
  Revision array
  Current flag where, the revision array consists of the following elements: (bind number, pointer to a sketch or bind media file name, temporary flag, bind time)
A correspondence information list is added each time a sketch is drawn or a media object is bound, with the bind number increasing beginning with 1 (1, 2, 3, . . . ). The default for the temporary flag is 1, indicating that editing is being performed.

In the first and second embodiments, the surrogate media management module 13 and surrogate media management module 23 maintain the current flag, respectively; in this embodiment, the correspondence management module 38 maintains both the current flag and the temporary flag. In addition, to identify the versions of a plurality of sketches and bound media objects, the current flag is set as follows:

Current flag=Bind number of the currently-displayed media object or sketch

This enables the user to identify versions with current flags, making thumbnail display switching easier. Revision1 for Surrogate2 is as follows:

Revision1

| Revision: | 1 | Sketch list | 1 | 10:24 April 1 |
| --- | --- | --- | --- | --- |
| | 2 | STAR.BMP | 1 | 13:30 April 1 |
| | 3 | STAR2.BMP | 1 | 15.17 April 1 |

Current flag: 2

In the above example, a sketch (comment "Illustration star") was created at 10:24 on April 1st, then STAR.BMP and STAR2BMP were bound. All the temporary flags are 1, indicating that editing is on half way. The current flag is 2, indicating STAR.BMP is now displayed.

Figure 13:
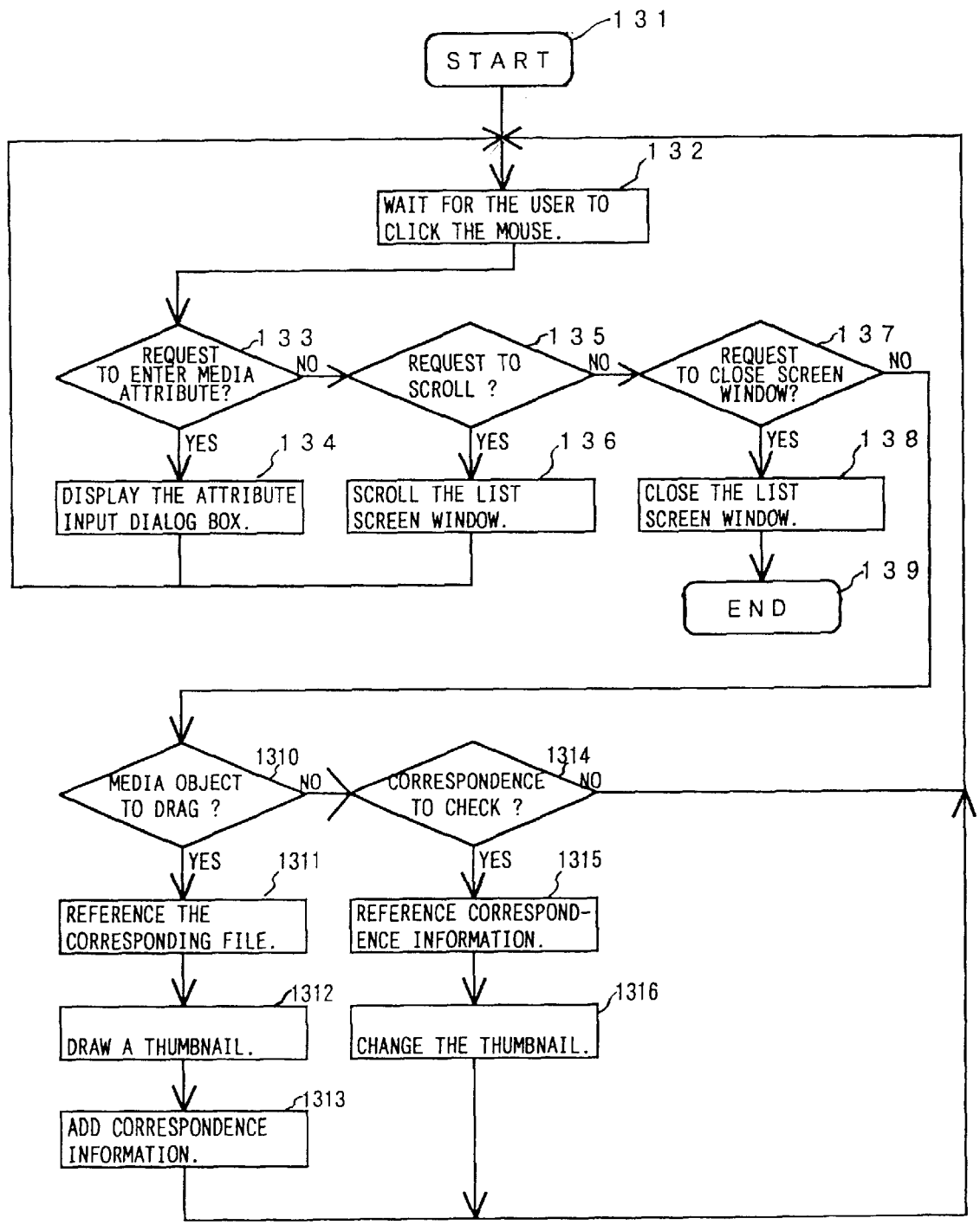
FIG. 13 is an example of a flowchart showing the operation of a surrogate media list module 34.

The following explains how the surrogate media list module 34, which uses the above description format, operates in the configuration described above. In particular, with reference to FIG. 13 showing the expanded part, the following details processing to be performed when the user clicks the mouse in the flowchart in FIG. 10 (steps 107–1014). More specifically, the module has an expanded capability to process a media bind request for a specific thumbnail or a thumbnail display switching request.

(1) Waits for the user to click the mouse (step 132).

(2) If the user clicks on a thumbnail, the module assumes that the user intends to enter a size attribute request for the corresponding surrogate media object and requests the media attribute input module 35 to display an attribute entry dialog box (steps 133 and 134). Otherwise, the module passes control to step 135.

(3) If the user requests to scroll the window, the module scrolls the list screen as directed by the user via the mouse (steps 135 and 136). Otherwise, the module passes control to step 137.

(4) If the user requests to close the window, the module closes the list screen window and ends processing (steps 137, 138, and 139). Otherwise, the module passes control to step 1310.

(5) If the user requests to drag and drop a media object on a specific thumbnail, the module references the corresponding media file (steps 1310 and 1311). Otherwise, the module passes control to step 1314.

(6) Creates a thumbnail of the file referenced in step 1311 and draws it in the thumbnail display area indicated by the drop request (step 1312).

(7) Additionally record the file name of the drawn thumbnail, temporary flag (default=1), current time, and current date to the revision array in the correspondence management module 38. In addition, the module assigns the additional bind number to the current flag in the correspondence management module 38 (step 1313).

(8) If a thumbnail display switch is requested, the module references the revision array via the current flag to determine the media object to be referenced next (steps 1314 and 1315). Otherwise, the module passes control back to step 132.

(9) Decrements the current flag value by 1 to display the thumbnail of the previous version (bound immediately before). When the current flag=0, the module displays the most-recently-bound media object in the thumbnail and sets current flag to the maximum bind number (step 1316).

Figure 7:
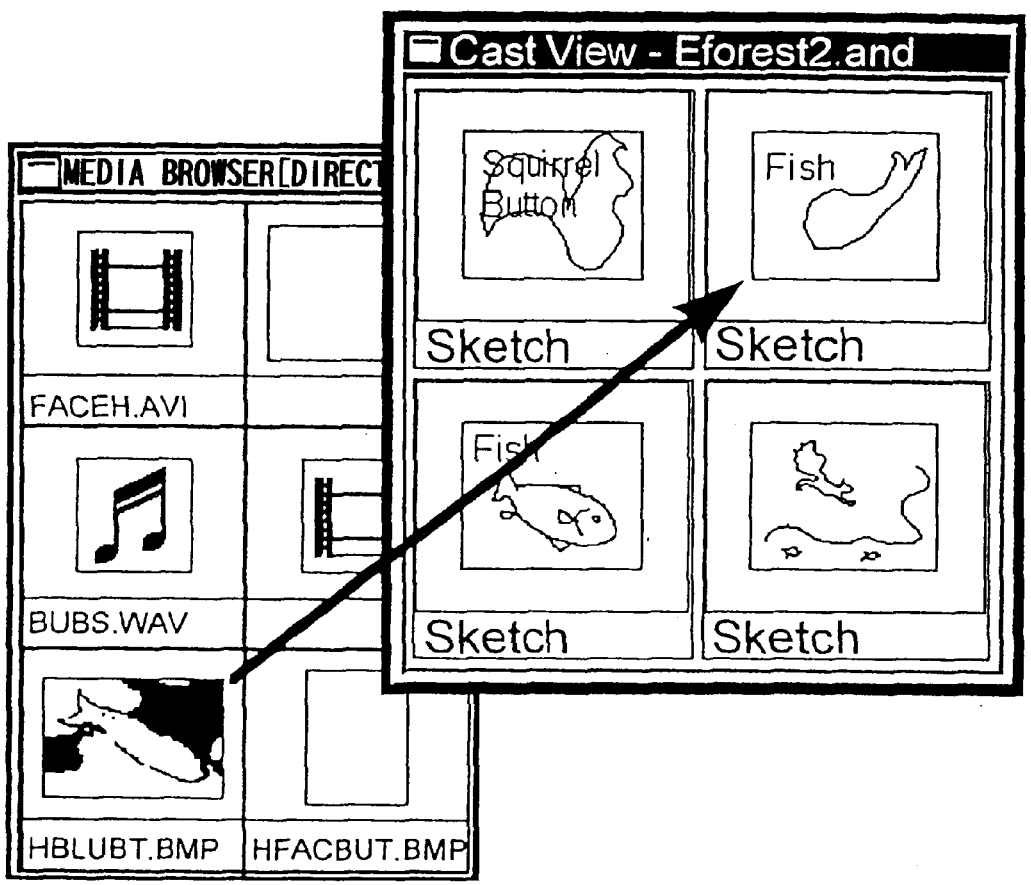
FIG. 7 is an example showing how a user uses a media browser to bind a media object to a thumbnail during execution of a surrogate media list module 34.

An input request in (5) above is shown in FIG. 7. In the figure, the bit map image file HBULBT.BMP, containing a fish image data, is dragged and dropped from the Media Browser onto a thumbnail in which a fish was drawn by the surrogate media list module 34. In this manner, a thumbnail is replaced by a file.

In (8) and (9) in the above flow, the user can switch the version, one at a time, by performing a simple operation such as right button-clicking.

In the flowchart shown in FIG. 13, the module may check the type of mouse operation in any order. In addition, the surrogate media list module 34 may display the thumbnail and its name as well as the number of versions, the version number of the thumbnail currently displayed, and the media type at the same time.

Although the setup of size information on a surrogate media object and the version management of media binding are done independently in this embodiment, they may be linked. That is, the media attribute input module 35 may allow the user to select a version of a surrogate media object and write the corresponding media type and size into the surrogate media management module 33 for later size calculation.

Fourth Embodiment (Fourth aspect)

Figure 4:
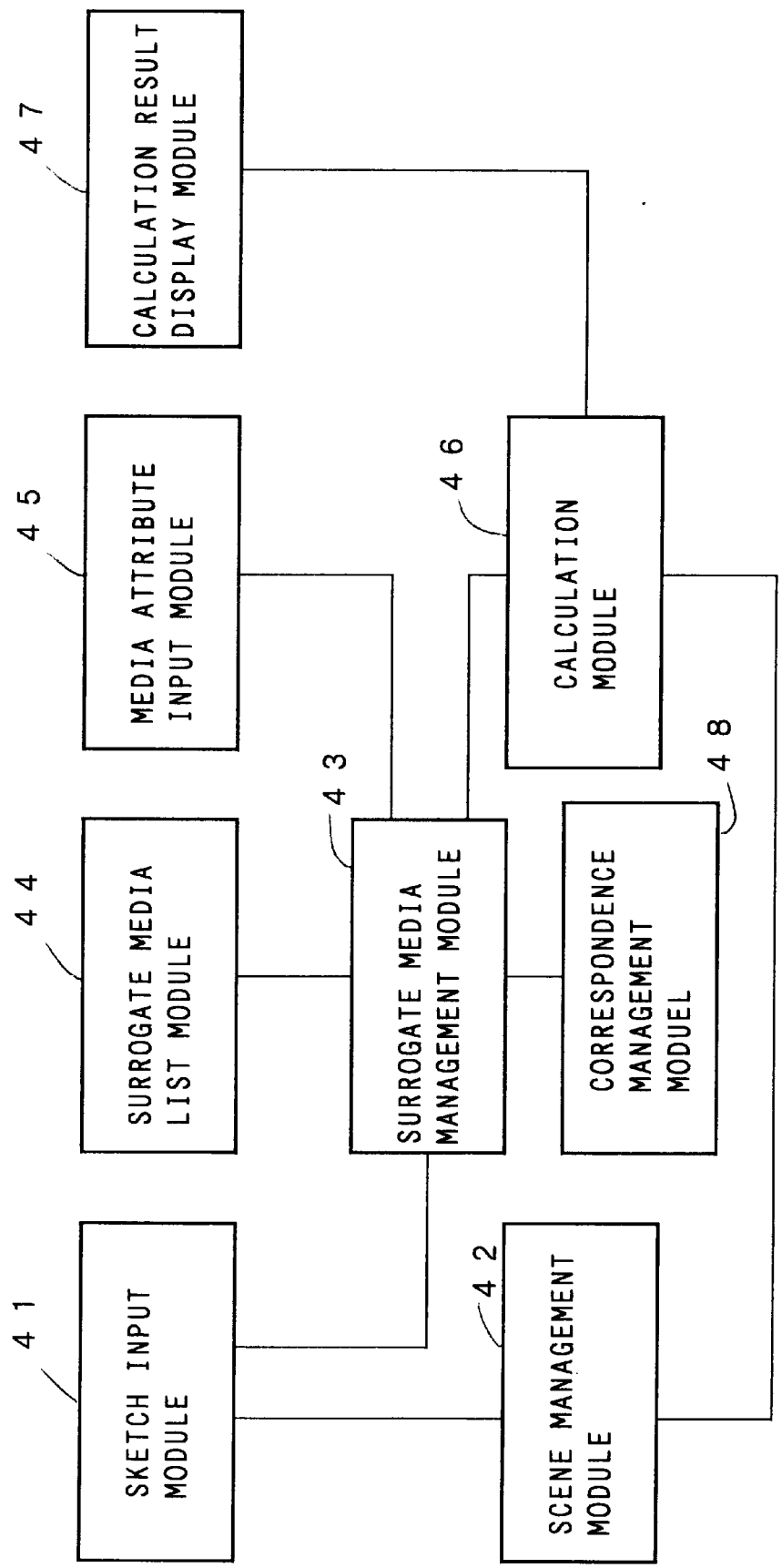
FIG. 4 is a block diagram showing a configuration of a fourth embodiment of a scenario editing system according to the present invention.

A fourth embodiment has the advantage of the third embodiment and, in addition to it, compares the number of completed media objects that have been bound to surrogate media objects, their size information, and their cost information with the total number of surrogate media objects, size information, and cost information to numerically display the progress of the application development. The fourth embodiment is shown in FIG. 4.

The configuration and operation of each of the following means are the same as those of the third embodiment:

Sketch input module 41

Scene management module 42

Surrogate media management module 43

Surrogate media list module 44 and

Correspondence management module 48.

The media attribute input module 45 is designed to allow the user to display or enter the value of the temporary flag that is stored in the correspondence management module 48 so that the user can specify that a bound media object is completed. That is, the user can change the value of the flag to 1 to specify that editing has completed. In addition, the module is designed to allow the user to specify the "category (classification) attribute", one of defined attributes, for use in progress level calculation. By default, the category attribute is a media type so that a progress level is calculated for each media type.

Figure 14:
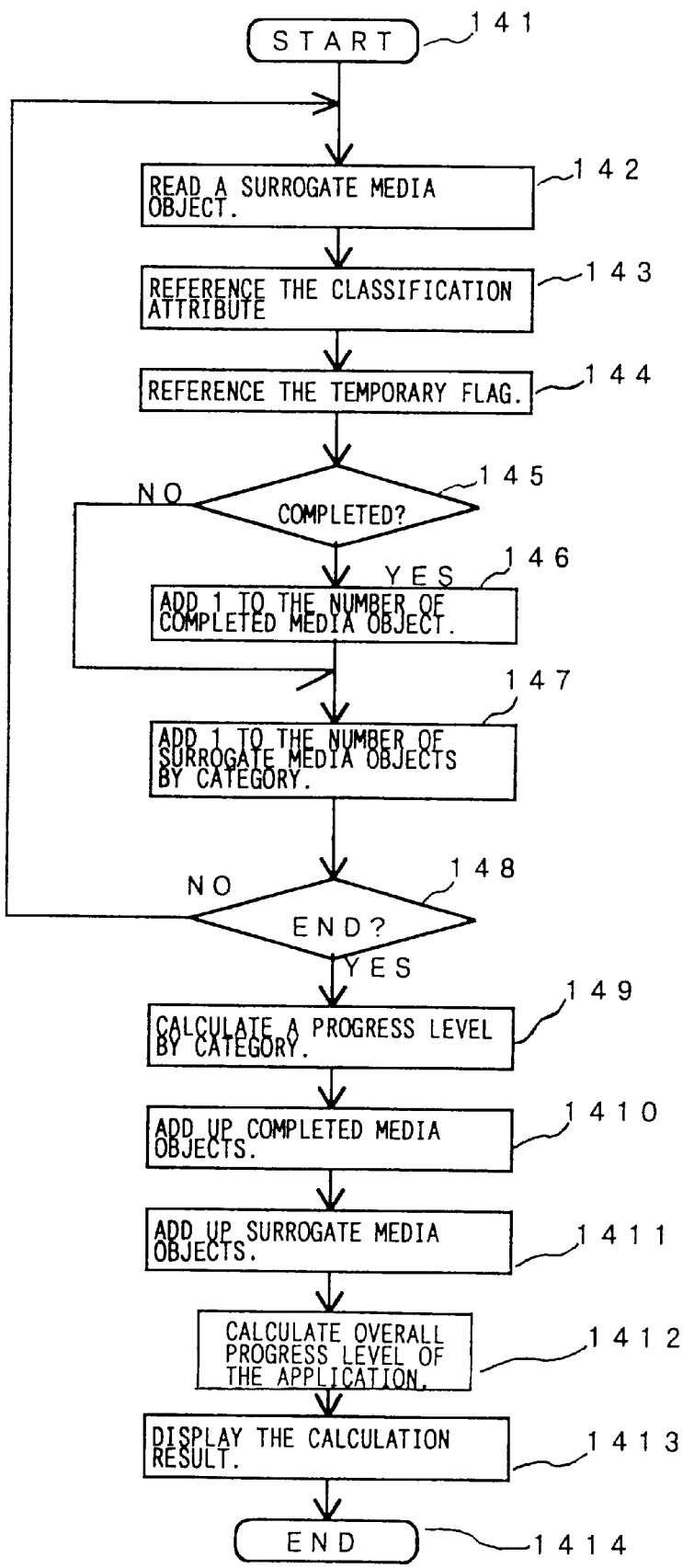
FIG. 14 is an example of a flowchart showing the operation of a calculation module 46.

A calculation module 46 performs progress calculation according to the flowchart shown in FIG. 14.

(1) Reads surrogate media objects, one at a time, from the surrogate media management module 43 (step 142).

(2) Checks the media attribute that is used as the category attribute to categorize surrogate media objects (step 143). For example, when "person in charge" is the category attribute, the module reads the person in charge information and classifies surrogate media objects by its value.

(3) Reads a revision from the correspondence management module 48 and references the temporary flag (step 144).

(4) If the editing completion flag is on (the value is 0), the module adds 1 to the number of completed media objects by category (steps 145 and 146). If editing is not completed, the module passes control to step 147.

(5) Adds 1 to the number of surrogate media objects by category (initial value 0) (step 147).

(6) Passes control to step 149 if all the surrogate media objects are read; otherwise, the module passes control to step 142 (step 148).

(7) Calculates the progress level by category according to the following formula. (step 149)

Progress level by category (%)=No. of completed media objects by category/No. of surrogate media objects by category×100

(8) Calculates the sum of completed media objects by category and the sum of surrogate media objects of the overall application to find the progress level of the overall application using the following formula: (steps 1410, 1411, and 1412)

Total progress level (%)=Sum of completed media objects/Sum of surrogate media objects×100

(9) Displays the calculation result in the calculation result display module 47 and ends processing (steps 1413 and 1414).

Figure 8:
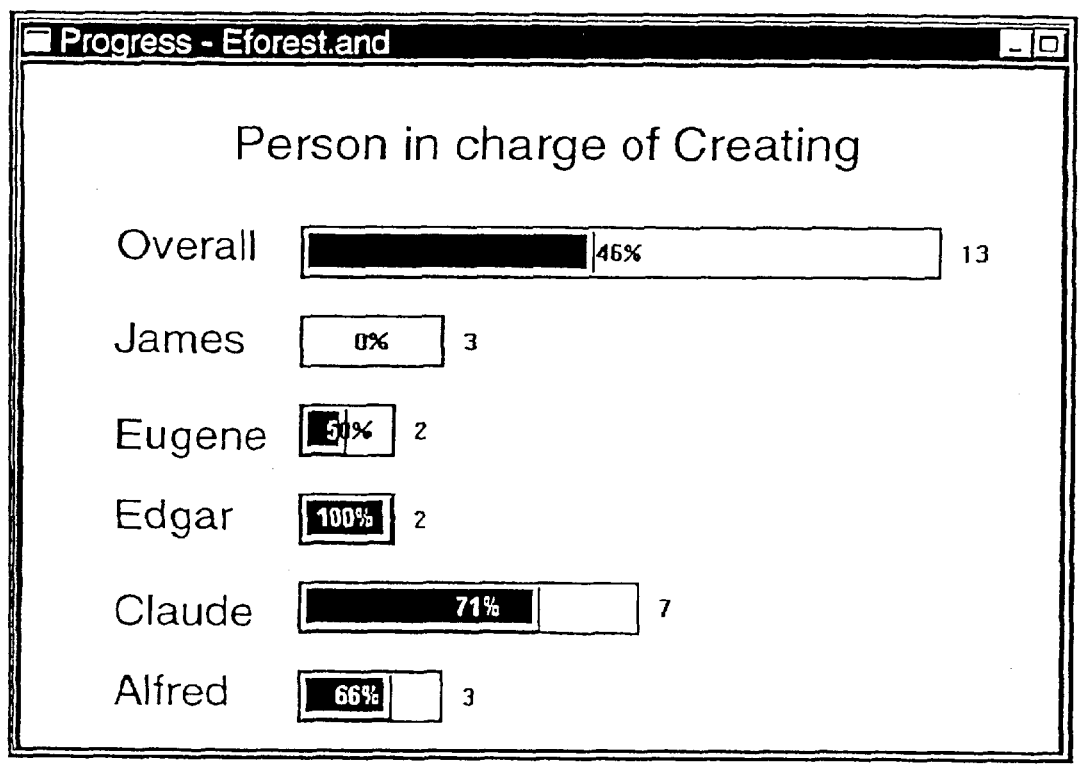
FIG. 8 is an example of a progress level display screen of an overall application and progress levels by category displayed by a calculation result display module 47 in FIG. 4.

The calculation result display module 47 displays the progress level by category as well as the progress level of the overall application. FIG. 8 is an example in which the item "person in charge" is the category attribute. The bar graph in the figure shows the progress level of the overall application and the progress level by person in charge (i.e., James, Eugene, Edgar, Claude, Alfred). A producer may specify any attribute as the category attribute to get information on the progress of the overall application development and the progress by category.

In the above embodiment, a ratio of number of completed media objects to the number of media objects to be created (surrogate media objects) is used: instead, a ratio of completed media objects to the total of surrogate media objects may also be calculated using a data size used in the first embodiment or a cost used in the second embodiment.

It should be noted that any modification obvious in the art may be done without departing from the gist and scope of the present invention as disclosed herein and claimed as appended.

What is claimed is:

1. A scenario editing system comprising:

a drawing input module drawing graphic media objects or inputting existing media objects;

a scene management module storing and managing said media objects;

a surrogate media management module storing said media objects for use as surrogate media objects temporarily representing actual moving picture objects, voice objects, or image objects to be created later;

a surrogate media list module displaying said surrogate media objects in a list of thumbnails;

a media attribute input module allowing a user to enter a media-dependent attribute of an actual media object to be created, while said surrogate media list module displays the list;

a calculation module calculating sizes of actual media data and adding up the media data sizes to estimate a total size of an overall application, based on said media-dependent attribute; and a calculation result display module displaying the result of said calculation.

2. A scenario editing system as defined in claim 1, wherein the media attribute input module allows a user to enter the name of a person in charge and scheduled development time as an attribute, wherein the calculation module adds up actual media creation costs for calculation of an estimate of the cost of each media type and an overall application, and wherein the calculation result display module displays cost information for each media type and for the overall application.

3. A scenario editing system as defined in claim 2, further comprising a correspondence management module, wherein the surrogate media list module (a) allows a user to drag and drop an icon or a thumbnail, representing a media file, onto one of surrogate media thumbnails to replace the surrogate media thumbnail, (b) stores information of the replacing media file in the correspondence management module for use as version information, and (c) changes the version of the surrogate media thumbnail in response to a user request.

4. A scenario editing system as defined in claim 3 wherein the media attribute input module allows a user to enter a category attribute as a media-dependent attribute, wherein the calculation module compares the number, size information, and cost information of completed actual media objects associated with the surrogate media with a total number, size information, and cost information of surrogate media objects to calculate a progress category by category and a progress of overall application development, and wherein the calculation result display module displays a result of said calculation.

5. A scenario editing system as defined in claim 1, wherein the media-dependent attribute includes size, display color depth, sampling rate, duration, and compression ratio of the actual media object to be created.

6. A scenario editing system comprising:

means for drawing graphic media objects or receiving existing media objects;

means for storing and managing said media objects in units of scenes;

means for storing and managing media objects as surrogate media objects temporarily representing actual media objects including moving picture objects, voice objects, and/or image objects;

means for displaying said surrogate media objects in a lists of thumbnails;

means for allowing a user to enter media-dependent attributes, while said surrogate media list means displays the list;

means for calculating the size of each piece of media data, estimating the size of an application; and means for displaying the result of said calculation.

7. A scenario editing system comprising;

means for drawing graphic media objects or receiving existing media objects;

means for storing and managing said media objects;

means for storing and managing said media objects as surrogate media objects temporarily representing actual media objects including moving picture objects, voice objects, and/or image objects;

means for displaying the surrogate media objects as a list of thumbnails;

means for allowing a user to enter a media-dependent attribute, while said surrogate media list means displays the list;

means for estimating the size of each type of media data and estimating the total cost of an application; and means for displaying the result of the estimation.

8. A scenario editing system comprising;

means for drawing graphic media objects or receiving existing media objects;

means for storing and managing said media objects;

means for storing and managing said media objects as surrogate media objects temporarily representing actual media objects including moving picture objects, voice objects, and/or image objects;

means for displaying the surrogate media objects as a list of thumbnails, for allowing a user to drag and drop an icon or a thumbnail, representing a media file, onto one of said surrogate media thumbnails to establish an association between them and to replace said displayed surrogate media thumbnail, and, at a later time, for changing said surrogate thumbnail in response to a user request;

means for storing and managing version information on said associated media file;

means for allowing a user to enter a media-dependent attribute of an actual media object to be created, while said surrogate media list means displays the list;

means for estimating the size and cost of an application based on said media-dependent attribute; and means for displaying the result of said estimation.

9. A scenario editing system comprising;

means for drawing graphic media objects or receiving existing media objects;

means for storing and managing said media objects;

means for storing and managing said media objects as surrogate media objects temporarily representing actual media objects including moving picture objects, voice objects, and/or image objects;

means for displaying said surrogate media objects as a list of thumbnails, for allowing a user to drag and drop an icon or a thumbnail, representing a media file, onto one of said surrogate media thumbnails to establish an association between them and to replace said displayed surrogate media thumbnail, and, at a later time, for changing said surrogate thumbnail in response to a user request;

means for storing and managing version information on said associated media file;

means for allowing a user to enter a media-dependent attribute of an actual media object to be created and a category attribute for progress level calculation, while said surrogate media list means displays the list;

means for comparing the number, size information, and cost information of associated and completed actual media objects associated with the surrogate media with the total number, size information, and cost information of surrogate media objects and for calculating a progress by category and a progress of overall application development, based on said media-dependent attribute; and means for displaying the result of said calculation.

* * * * *